(12) United States Patent
Choi

(10) Patent No.: US 8,917,192 B2
(45) Date of Patent: Dec. 23, 2014

(54) PORTABLE TERMINAL HAVING KEYPAD

(75) Inventor: Seung-Chul Choi, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 721 days.

(21) Appl. No.: 13/243,469

(22) Filed: Sep. 23, 2011

(65) Prior Publication Data

US 2012/0081240 A1 Apr. 5, 2012

(30) Foreign Application Priority Data

Sep. 30, 2010 (KR) ........................ 10-2010-0095656

(51) Int. Cl.
| | | |
|---|---|---|
| *H03K 17/94* | (2006.01) | |
| *H04M 1/00* | (2006.01) | |
| *H01Q 1/00* | (2006.01) | |
| *G08B 1/08* | (2006.01) | |
| *H01Q 9/42* | (2006.01) | |
| *H01Q 1/44* | (2006.01) | |
| *H01Q 1/24* | (2006.01) | |
| *H04M 1/23* | (2006.01) | |
| *G06F 1/16* | (2006.01) | |
| *H01Q 1/38* | (2006.01) | |
| *H01H 13/76* | (2006.01) | |

(52) U.S. Cl.
CPC ............... *H01H 13/76* (2013.01); *H01Q 9/42* (2013.01); *H01Q 1/44* (2013.01); *H01H 2239/006* (2013.01); *H01Q 1/243* (2013.01); *H04M 1/23* (2013.01); *G06F 1/1626* (2013.01); *H01Q 1/38* (2013.01); *G06F 1/1698* (2013.01)

USPC ................ 341/22; 341/24; 341/25; 341/26; 340/538.15; 340/539.1; 340/572.3; 340/572.8; 455/575.5; 455/550.1; 343/702; 343/722; 343/719; 343/893; 343/906

(58) Field of Classification Search
CPC ..... G06F 1/1626; G06F 1/1698; H01H 13/76; H01Q 9/42; H01Q 1/243; H01Q 1/38; H01Q 1/44; H04M 1/23
USPC ........ 341/26, 22, 24, 25; 340/538.15, 538.16, 340/539.1, 572.3, 572.4, 572.5, 572.7, 340/572.8; 200/5 A
See application file for complete search history.

(56) References Cited

U.S. PATENT DOCUMENTS 6,812,898 B2 * 11/2004 Doub et al. ................... 343/702
7,388,547 B2 * 6/2008 Lee ............................... 343/702

FOREIGN PATENT DOCUMENTS

CN 101854411 * 5/2010 ............. H01Q 1/22

* cited by examiner

*Primary Examiner* — Daniel Wu
*Assistant Examiner* — Mancil Littlejohn, Jr.

(57) ABSTRACT

A portable terminal has a keypad. The portable terminal includes the keypad including a plurality of key buttons in a predetermined pattern and forming an antenna pattern by using devices connected to both ends of predetermined key buttons among the plurality of key buttons, a Radio Frequency (RF) communicator connected to signal lines of the predetermined key buttons of the keypad, a digital circuit for recognizing a signal input to the keypad, and a controller for controlling the keypad to be selectively switched to one of the digital circuit and the RF communicator according to a signal generated in a resonance frequency region of a particular service band.

20 Claims, 5 Drawing Sheets

PORTABLE TERMINAL HAVING KEYPAD

CROSS-REFERENCE TO RELATED APPLICATION(S) AND CLAIM OF PRIORITY

The present application is related to and claims the benefit under 35 U.S.C. §119(a) of a Korean Patent Application filed in the Korean Intellectual Property Office on Sep. 30, 2010 and assigned Serial No. 10-2010-0095656, the entire disclosure of which is hereby incorporated by reference.

TECHNICAL FIELD OF THE INVENTION

The present invention relates to a portable terminal having a keypad, and more particularly, to a portable terminal having a keypad, some pattern of which is used for a Printed Circuit Board Embedded Antenna (PEA).

BACKGROUND OF THE INVENTION

With the development of various electronic and communication industries, portable terminals have been widely used, and to meet users' demands, functions of the portable terminals have been diversified and the portable terminals have become compact and lightweight.

Early products of the portable terminals have superior antenna radiation efficiency by using external antennas, but due to restriction on slimness and high-integration of the portable terminals, embedded antennas are now actively used for the portable terminals.

However, to configure the external or embedded antenna, an antenna pattern separate from an injection-molded product has to be implemented, increasing the cost of the portable terminal. For this reason, recently, an antenna has been implemented by printing an antenna pattern on a Printed Circuit Board (PCB) without cost increase.

FIGS. 1A through 1C illustrate structural diagrams of an embedded antenna of a conventional portable terminal.

FIG. 1A shows a rear side of a portable terminal in which a PCB Embedded Antenna (PEA) is embedded in a fill-cut region 100 on a lower end portion of the portable terminal. FIG. 1B shows a front side of the portable terminal in which PCB-attaching dome sheets 102 and 104 exist. FIG. 1C shows a region 108 in which the PEA and the dome sheets 102 and 104 are coupled and embedded in the PCB. To implement an antenna by printing a pattern in the PCB, a fill-cut region having a predetermined area or larger, that is, a region where there is no pattern and only a dielectric layer exists, in spite of some variation according to frequency bands, is required and any other metal pattern should not exist in that region.

If an effective area of the fill-cut region except for other metal pattern regions is inefficient, antenna resonance may not be generated at a desired frequency or in spite of generation of resonance, the antenna function may not be achieved due to low antenna radiation efficiency. The reduction of the effective area originates from a pattern on the PCB at a lower end of the portable terminal where a key recognizing dome of a keypad is situated.

As shown in FIGS. 1A through 1C, conventionally, PCB-attaching dome sheets exist on an opposite side to a portion for implementing an antenna pattern, and the pattern is implemented to allow a dome to be situated on the PCB for dome key operations, reducing an antenna embedding region and thus making it difficult to implement a PEA.

SUMMARY OF THE INVENTION

To address the above-discussed deficiencies of the prior art, it is a primary object to provide a portable terminal having a keypad to use some pattern of the keypad for a PEA, in which predetermined devices are connected to predetermined key buttons among a plurality of key buttons of a dome-pattern keypad printed on a PCB, thereby improving antenna radiation performance without causing collision between chip devices electrically connected on the PCB.

According to an aspect of the present disclosure, there is provided a portable terminal having a keypad. The portable terminal includes the keypad including a plurality of key buttons in a predetermined pattern and forming an antenna pattern by using devices connected to both ends of predetermined key buttons among the plurality of key buttons, a Radio Frequency (RF) communicator connected to a signal line of the predetermined key buttons of the keypad, a digital circuit for recognizing a signal input to the keypad, and a controller for controlling the keypad to be selectively switched to the digital circuit or the RF communicator according to a signal generated in a resonance frequency region of a particular service band.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 2 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged portable terminal. In the following description, specific items are described only to provide overall understanding of the present invention and it is apparent to those of ordinary skill in the art that changes or modifications can be made without departing from the scope of the present invention.

The present disclosure proposes a technique for using some pattern of a keypad included in a portable terminal for a Printed Circuit Board Embedded Antenna (PEA), especially in which a discrete digital signal input through devices connected to predetermined key buttons among a plurality of key buttons provided in a dome-pattern keypad printed on a PCB is separated from a resonance frequency region of a corresponding service band and is applied to a digital circuit, and in case of Radio Frequency (RF) resonance due to application of a frequency signal, the keypad is short-circuited with an RF communicator, thereby removing a need for securing a space for the PEA and improving antenna radiation performance without collision between chip devices, thus contributing to slimness and high integration.

A portable terminal according to the present disclosure may be applied to any kind of information communication devices and multimedia devices, such as a digital broadcasting terminal, a Personal Digital Assistant (PDA), a smart phone, and 3G terminals such as an International Mobile Telecommunication (IMT)-2000 terminal, a Wideband Code Division Multiple Access (WCDMA) terminal, a Global System for Mobile Communication Packet Radio Service (GSM/GPRS) terminal, and a Universal Mobile Telecommunication Service (UMTS) terminal, and applications thereof.

While predetermined key buttons according to the present disclosure are assumed to be, for example, a start button, a zero button, and a sharp button in the following description, the subject matter of the present disclosure is not limited to those examples.

Hereinafter, a portable terminal having a keypad according to the present disclosure will be described in detail with reference to FIGS. 2 through 4.

Figure 1A:
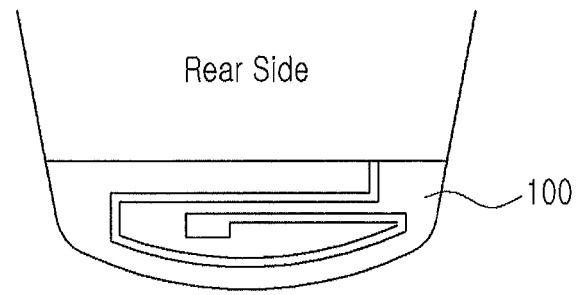
FIGS. 1A through 1C illustrate structural diagrams of an embedded antenna of a conventional portable terminal.
Figure 1B:
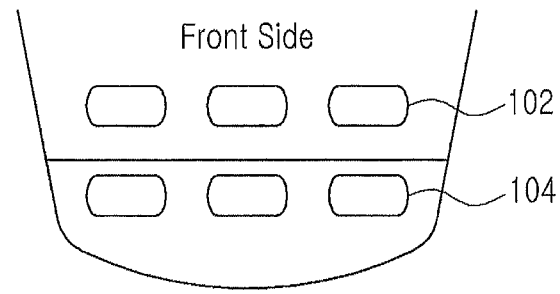
Figure 1C:
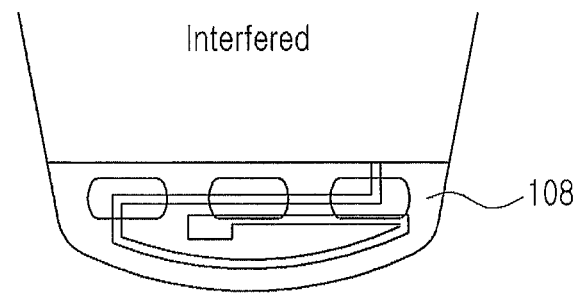
Figure 2:
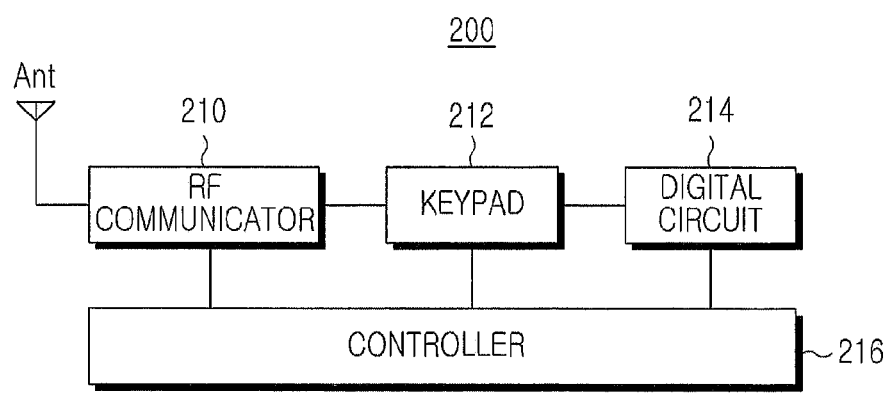
FIG. 2 illustrates a block diagram of a portion of a portable terminal having a keypad according to the present disclosure.

FIG. 2 is a block diagram of a portion of a portable terminal having a keypad according to the present disclosure.

Referring to FIG. 2, a portable terminal 200 having a keypad 212 includes a Radio Frequency (RF) communicator 210, the keypad 212, a digital circuit 214, and a controller 216.

According to various embodiments of the present disclosure, the RF communicator 210 is connected with signal lines of predetermined key buttons of the keypad 212, receives a radio downlink signal from the air via an antenna, and outputs downlink data acquired by demodulating the radio downlink signal to the controller 216. The RF communicator 210 generates a radio uplink signal by modulating uplink data input from the controller 216, and wirelessly transmits the generated radio uplink signal to the air via the antenna. The modulation and the demodulation may be preferably performed according to Code Division Multiple Access (CDMA), Frequency Division Multiplexing (FDM), or Time Division Multiplexing (TDM).

The digital circuit 214 recognizes a signal input to the keypad 212. That is, upon input of a signal to an arbitrary key button among a plurality of key buttons provided in the keypad 212, the digital circuit 214 receives a voltage based on a resistor connected to the input key button and receives an output signal of the keypad 212 to recognize which key button is input and to output the recognition result to the controller 216.

The keypad 212 includes a plurality of key buttons in a predetermined pattern and forms an antenna pattern by using devices connected to both ends of predetermined key buttons among the plurality of key buttons.

Figure 3A:
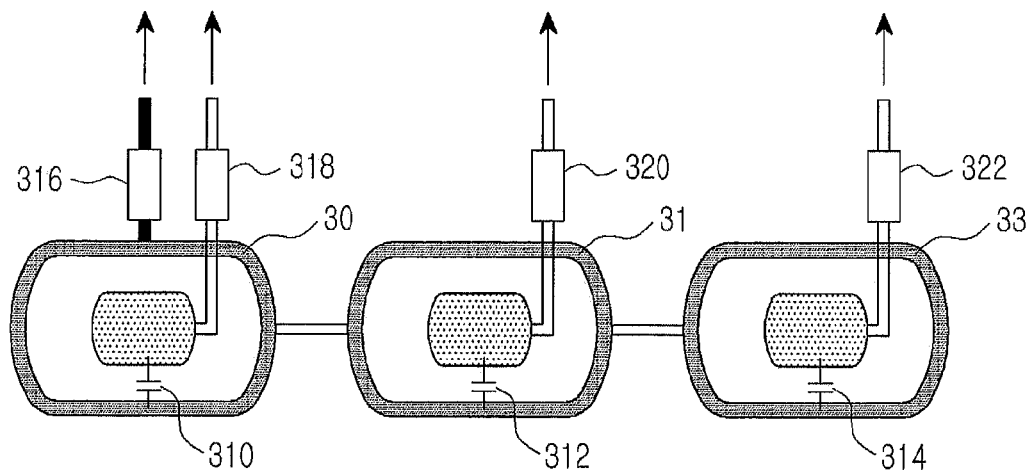
FIGS. 3A through 3C illustrate structural diagrams of some key buttons of a keypad of a portable terminal having the keypad according to the present disclosure.
Figures 3B, 3C:
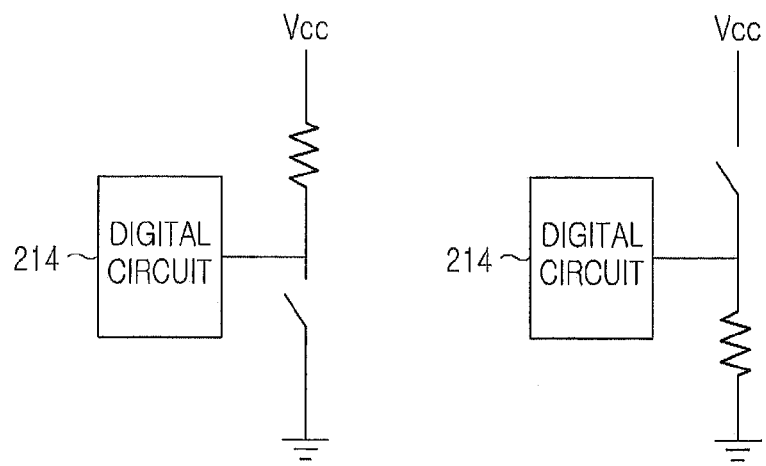

FIGS. 3A through 3C illustrates structural diagrams of some key buttons of the keypad 212 of the portable terminal according to the present disclosure.

The keypad 212 is connected to the digital circuit 214. Upon pressing of a particular key button, a signal is input to the digital circuit 214 through contact between contact points. As shown in FIGS. 3B and 3C, there are two representative circuits. In other words, upon pressing of a key button, a logic value 0 is input to the digital circuit 214 in a circuit shown in FIG. 3B and a logic value 1 is input to the digital circuit 214 in a circuit shown in FIG. 3C. The circuits of a plurality of key buttons provided in the keypad 212 as shown in FIGS. 3B and 3C are connected to the digital circuit 214 through digital signal lines, i.e., key_sense lines and scan lines.

The keypad 212 according to various embodiments of the present disclosure is selectively switched to the digital circuit 214 or the RF communicator 210 under the control of the controller 216 by connecting capacitors 310, 312, and 314 to one ends of predetermined key buttons 30, 31, and 33 connected to the scan line in parallel and to the key_sense lines serially and by serially connecting inductors or beads 316, 318, 320, and 322 to another ends of the predetermined key buttons 30, 31, and 33 serially connected to the key_sense lines.

Herein, the capacitors 310, 312, and 314 having predetermined capacitance values are connected to the scan line in parallel and to the key_sense lines serially to cause the keypad 212 to be short-circuited with the RF communicator 210 when RF resonance is generated due to application of a frequency signal. As a result, current does not flow along the scan line and the key_sense lines to which the capacitors 310, 312, and 314 are connected, thereby short-circuiting the keypad 212 and the RF communicator 210 which are electrically coupled to each other on the PCB in case of RF resonance, and thus preventing collision between the keypad 212 and the RF communicator 210.

In addition, inductors or beads 316, 318, 320, and 322 having predetermined inductance values or bead values are serially connected to the key_sense lines to separate a discrete digital signal input to the keypad 212 from a resonance frequency region of a corresponding service band and apply the separated discrete digital signal to the digital circuit 214. The inductors or beads 316, 318, 320, and 322 serve as short-circuits in serially connected circuits, such that as a resistance value increases in a corresponding frequency region, the flow of current is not smooth and thus the digital signal input to a key button separately from the RF communicator 210 is applied to the digital circuit 214.

The controller 216 controls the overall operation of the portable terminal, and controls the keypad 212 to be selectively switch to the digital circuit 214 or the RF communicator 210 according to a signal generated in a resonance frequency region of a particular service band.

The controller 216 receives an output signal of the keypad 212 from the digital circuit 214 to perform a function corresponding to a key button.

Figure 4:
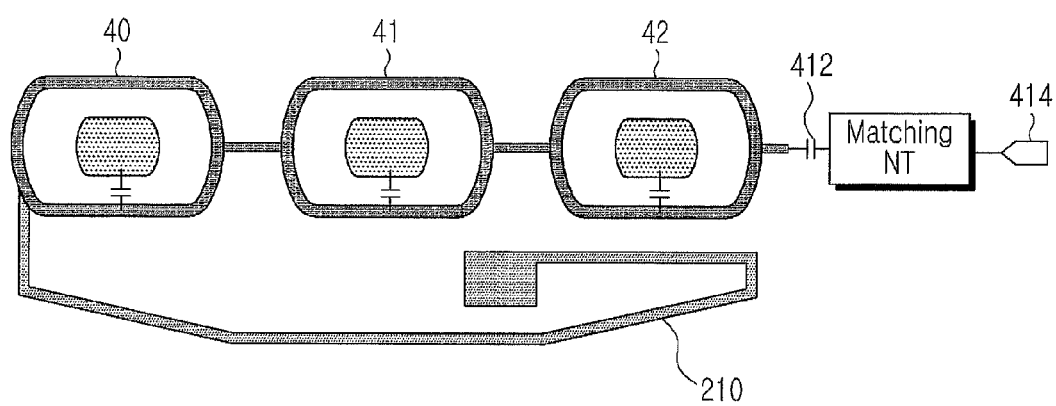
FIG. 4 illustrates a block diagram of a portion of a Radio Frequency (RF) communicator having a dummy pattern connected to a keypad according to the present disclosure.

FIG. 4 is a block diagram of a portion of the RF communicator 210 having a dummy pattern connected along key- _sense lines of predetermined key buttons of the keypad 212 to perform an antenna function according to the present disclosure.

The RF communicator 210 is serially connected to an antenna feeder 414 through a Direct Current (DC) blocking capacitor 412 along a scan line connected to predetermined key buttons 40, 41, and 42 of the keypad 212. Through the DC blocking capacitor 412, a frequency signal is provided to the RF communicator 210, such that in case of generation of RF resonance, Alternating Current (AC) and DC components are separated to pass the AC components and block the DC components, thereby preventing the antenna feeder 414 from being affected by the DC components.

A portion of the RF communicator 210 electrically coupled on the PCB and formed along the key_sense lines of the predetermined key buttons 40, 41, and 42 to perform an antenna function is formed as a dummy pattern for optimally improving the antenna radiation performance of the RF communicator 210.

Figure 5:
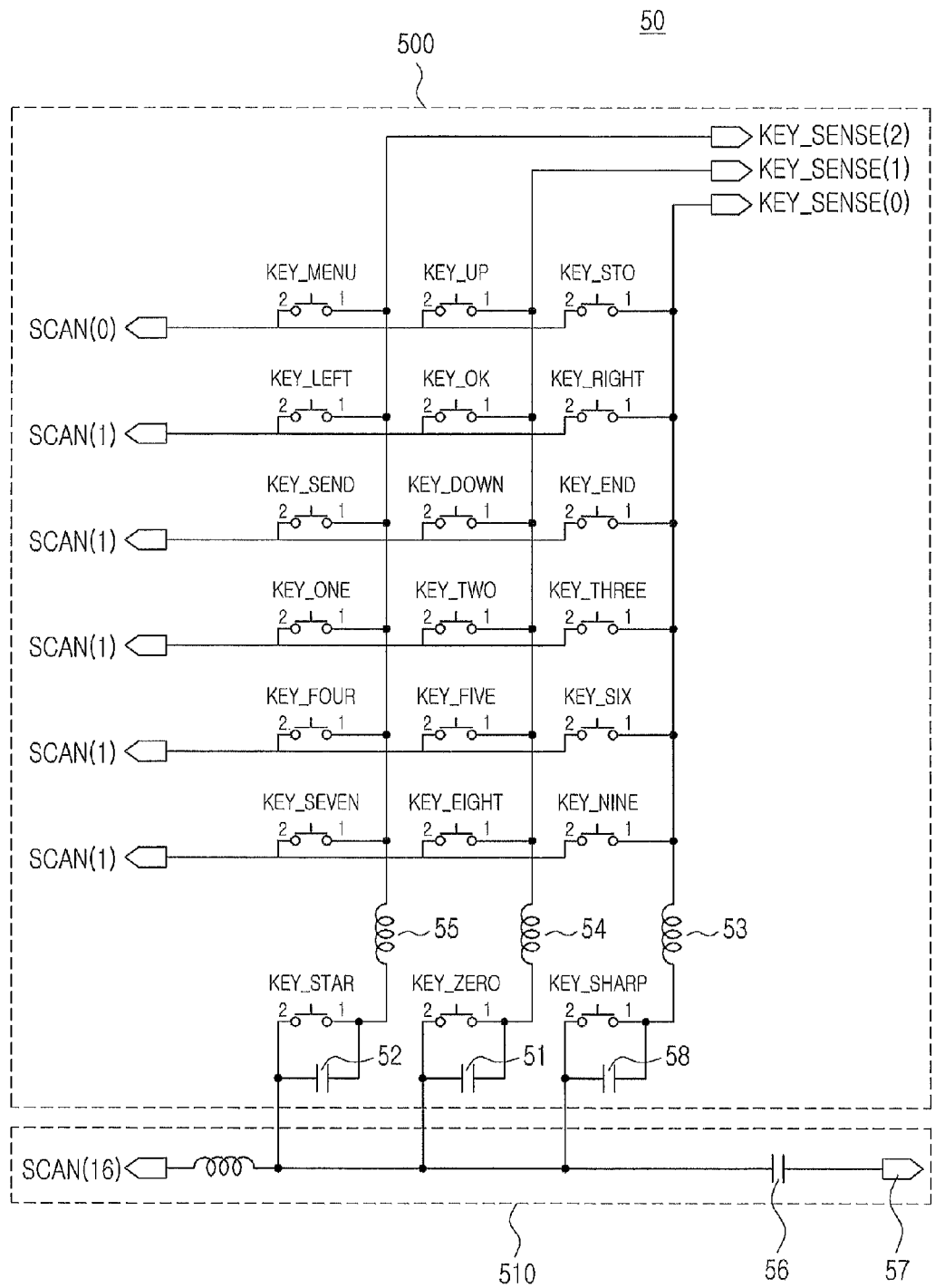
FIG. 5 illustrates a circuit diagram of a portion of a portable terminal having a keypad according to the present disclosure.

FIG. 5 is a circuit diagram 50 of a portion of a portable terminal having a keypad according to the present disclosure. The circuit diagram 50 is executed by designing scan keypad digital logic of 7 columns×3 rows composed of a keypad 500 and an RF communicator 510. A plurality of key buttons of the keypad 500 may include key buttons for selecting numbers (e.g., 0-9) and key buttons for selecting functions (e.g., a navigation key, a menu key, an OK key, etc.).

Under the control of a controller (not shown), the keypad 500 separates a discrete digital signal input to a particular key button of the keypad 500 from a resonance frequency region of a corresponding service band to provide the discrete digital signal to a digital circuit (not shown) through inductors or beads 53, 54, and 55 serially connected to one ends of predetermined key buttons (Start, Zero, and Sharp) connected to key_sense lines, and the keypad 500 provides a frequency signal to the RF communicator 510 through capacitors 58, 51, and 52 connected to another ends of the predetermined key buttons connected to a scan line in parallel and to the key_sense lines serially, such that in case of generation of RF resonance, the keypad 500 is short-circuited with the RF communicator 510.

The RF communicator 510 is serially connected to an antenna feeder 57 through a DC blocking capacitor 56 on the scan line along the respective key_sense lines of the predetermined key buttons, such that in case of generation of RF resonance, AC components are passed and DC components are blocked by the DC blocking capacitor 56, thereby preventing the antenna feeder 57 from being affected by the DC components.

According to the present disclosure, through devices connected to predetermined key buttons of a dome-pattern keypad printed on a PCB, the keypad is separated in a corresponding frequency region upon generation of a digital signal, and the keypad is short-circuited in case of generation of RF resonance, thereby removing a need for securing a space for an embedded antenna and improving antenna radiation performance without collision between chip devices, thus contributing to slimness and high integration.

As such, operations related to the portable terminal having the keypad according to the present disclosure can be performed, and while the present disclosure has been shown and described with reference to exemplary embodiments thereof, it will be understood by those skilled in the art that various changes in form and details may be made therein without departing from the spirit and scope of the invention as defined by the appended claims.

Although the present disclosure has been described with exemplary embodiments, various changes and modifications may be suggested to one skilled in the art. It is intended that the present disclosure encompass such changes and modifications as fall within the scope of the appended claims.

What is claimed is:

1. A portable terminal having a keypad, the portable terminal comprising:
   the keypad comprising a plurality of key buttons in a predetermined pattern and forming an antenna pattern by using devices connected to both ends of predetermined key buttons among the plurality of key buttons;
   a Radio Frequency (RF) communicator connected to signal lines of the predetermined key buttons of the keypad;
   a digital circuit for recognizing a signal input to the keypad; and
   a controller for controlling the keypad to be selectively switched to one of the digital circuit and the RF communicator according to a signal generated in a resonance frequency region of a particular service band.

2. The portable terminal of claim 1, wherein the devices connected to both ends of the predetermined key buttons are one of capacitors having predetermined capacitance values, inductors having predetermined inductance values, and beads having predetermined bead values.

3. The portable terminal of claim 1, wherein the keypad is separated from the RF communicator in a resonance frequency region of the particular service band through one of inductors and beads connected to the predetermined key buttons upon input of a discrete digital signal to the predetermined key buttons.

4. The portable terminal of claim 1, wherein the keypad is serially connected with the RF communicator.

5. The portable terminal of claim 1, wherein the keypad is short-circuited with the RF communicator through capacitors connected to the predetermined key buttons upon application of a particular frequency signal to the RF communicator and generation of RF resonance.

6. The portable terminal of claim 1, wherein in the RF communicator, Direct Current (DC) components are blocked on a signal line connected to an antenna feeder by a DC blocking capacitor connected to signal lines serially connected to the keypad.

7. The portable terminal of claim 1, wherein the keypad is installed on a Printed Circuit Board (PCB) having a dummy pattern.

8. The portable terminal of claim 1, wherein the plurality of key buttons in the predetermined pattern are dome key switches formed by sequentially coupling metal dome switches and metal dome sheets on a Printed Circuit Board (PCB).

9. The portable terminal of claim 1, wherein the portable terminal is one of a digital broadcasting terminal, a Personal Digital Assistant (PDA), and a smart phone.

10. A method for operating a portable terminal having a keypad, the method comprising:
   recognizing, by a digital circuit, a signal input to the keypad, wherein the keypad comprises a plurality of key buttons in a predetermined pattern and forms an antenna pattern by using devices connected to both ends of predetermined key buttons among the plurality of key buttons; and
   controlling, by a controller, the keypad to be selectively switched to one of the digital circuit and a Radio Frequency (RF) communicator according to a signal generated in a resonance frequency region of a particular service band, wherein the RF communicator is connected to signal lines of the predetermined key buttons of the keypad.

11. The method of claim 10, wherein the devices connected to both ends of the predetermined key buttons are one of capacitors having predetermined capacitance values, inductors having predetermined inductance values, and beads having predetermined bead values.

12. The method of claim 10, wherein the keypad is separated from the RF communicator in a resonance frequency region of the particular service band through one of inductors and beads connected to the predetermined key buttons upon input of a discrete digital signal to the predetermined key buttons.

13. The method of claim 10, wherein the keypad is serially connected with the RF communicator.

14. The method of claim 10, wherein the keypad is short-circuited with the RF communicator through capacitors connected to the predetermined key buttons upon application of a particular frequency signal to the RF communicator and generation of RF resonance.

15. The method of claim 10, wherein in the RF communicator, Direct Current (DC) components are blocked on a signal line connected to an antenna feeder by a DC blocking capacitor connected to signal lines serially connected to the keypad.

16. The method of claim 10, wherein the keypad is installed on a Printed Circuit Board (PCB) having a dummy pattern.

17. The method of claim 10, wherein the plurality of key buttons in the predetermined pattern are dome key switches formed by sequentially coupling metal dome switches and metal dome sheets on a Printed Circuit Board (PCB).

18. The method of claim 10, wherein the portable terminal is one of a digital broadcasting terminal, a Personal Digital Assistant (PDA), and a smart phone.

19. A portable terminal having a keypad, the portable terminal comprising:
the keypad comprising a plurality of key buttons in a predetermined pattern and forming an antenna pattern by using devices connected to both ends of predetermined key buttons among the plurality of key buttons;
a Radio Frequency (RF) communicator connected to signal lines of the predetermined key buttons of the keypad;
a digital circuit for recognizing a signal input to the keypad; and
a controller for controlling the keypad to be selectively switched to one of the digital circuit and the RF communicator according to a signal generated in a resonance frequency region of a particular service band, wherein the keypad is separated from the RF communicator in a resonance frequency region of the particular service band through one of inductors and beads connected to the predetermined key buttons upon input of a discrete digital signal to the predetermined key buttons.

20. The portable terminal of claim 19, wherein the keypad is short-circuited with the RF communicator through capacitors connected to the predetermined key buttons upon application of a particular frequency signal to the RF communicator and generation of RF resonance.

* * * * *